Sept. 13, 1955 M. LEWINSTEIN 2,717,999
AUTOMATIC RANGE GATE
Filed Jan. 7, 1949 3 Sheets-Sheet 1

INVENTOR
MARCUS LEWINSTEIN
BY Paul B. Hunter
ATTORNEY

INVENTOR
MARCUS LEWINSTEIN
BY
Paul B. Hunter
ATTORNEY

United States Patent Office 2,717,999
Patented Sept. 13, 1955

2,717,999

AUTOMATIC RANGE GATE

Marcus Lewinstein, Jamaica, N. Y., assignor to Sperry Rand Corporation, a corporation of Delaware Application January 7, 1949, Serial No. 69,753

8 Claims. (Cl. 343—7.3)

This invention relates to improvements in distance measuring systems of the pulse radar type, and more particularly to range tracking systems for continuously following or tracking a moving target in range.

Such systems usually employ a "range gate," which is a pulse or a square wave voltage delayed with respect to the transmitted pulse by an interval corresponding to the distance or range a which a target is sought or located. When a target exists at a distance corresponding to said interval, the transmitted pulse reflected by it returns and is received coincidentally within the duration of the range gate. For seeking a target, the range gate may be swept outward through the portion of the range being examined, by slowly increasing the delay of the gate voltage wave or pulse with respect to the transmitted pulse.

Upon coincidence between the range gate and a received pulse, the continuous change in delay or "range sweep" is stopped and the delay is thereafter varied only as the received pulse deviates from coincidence with the gate. Any such deviation may be utilized to produce an error signal which changes the delay in the required manner and also controls a follow-up system to supply range information to a range indicator and/or a computer or other utilization device which is required to respond to the target range.

The principal object of the present invention is to provide improved ranging systems capable of locating and tracking rapidly moving targets such as high speed aircraft with accuracy sufficient for such purposes as directing antiaircraft fire, and throughout wide variations in range.

Another object is to provide means and methods for automatic range tracking wherein a relatively wide movable range gate controls the starting point, i. e. the minimum range, of a relatively narrow range gate which moves cyclically between two limiting values of range to sweep or "search" for a target within said limits.

A further object of the invention is to provide a system of the described type wherein a narrow gate is cyclically moved between range limits set by the position of a wide gate in order to quickly lock on a target within said limits, said narrow gate thereafter remaining on the target while the wide gate is caused to drift slowly to a position such that the narrow gate is at the center of the wide gate.

Viewed in another aspect, it is an important object of the present invention to provide a ranging system wherein a wide and relatively sluggish movable range gate controls the sweep limits of a narrow rapidly moving range gate for searching in range, and coincidence or deviation from coincidence between a return pulse and said narrow gate controls the motion of said wide gate so as to tend to maintain the narrow gate centered on the wide gate.

The invention will be described with reference to the accompanying drawings, wherein.

Figure 1:
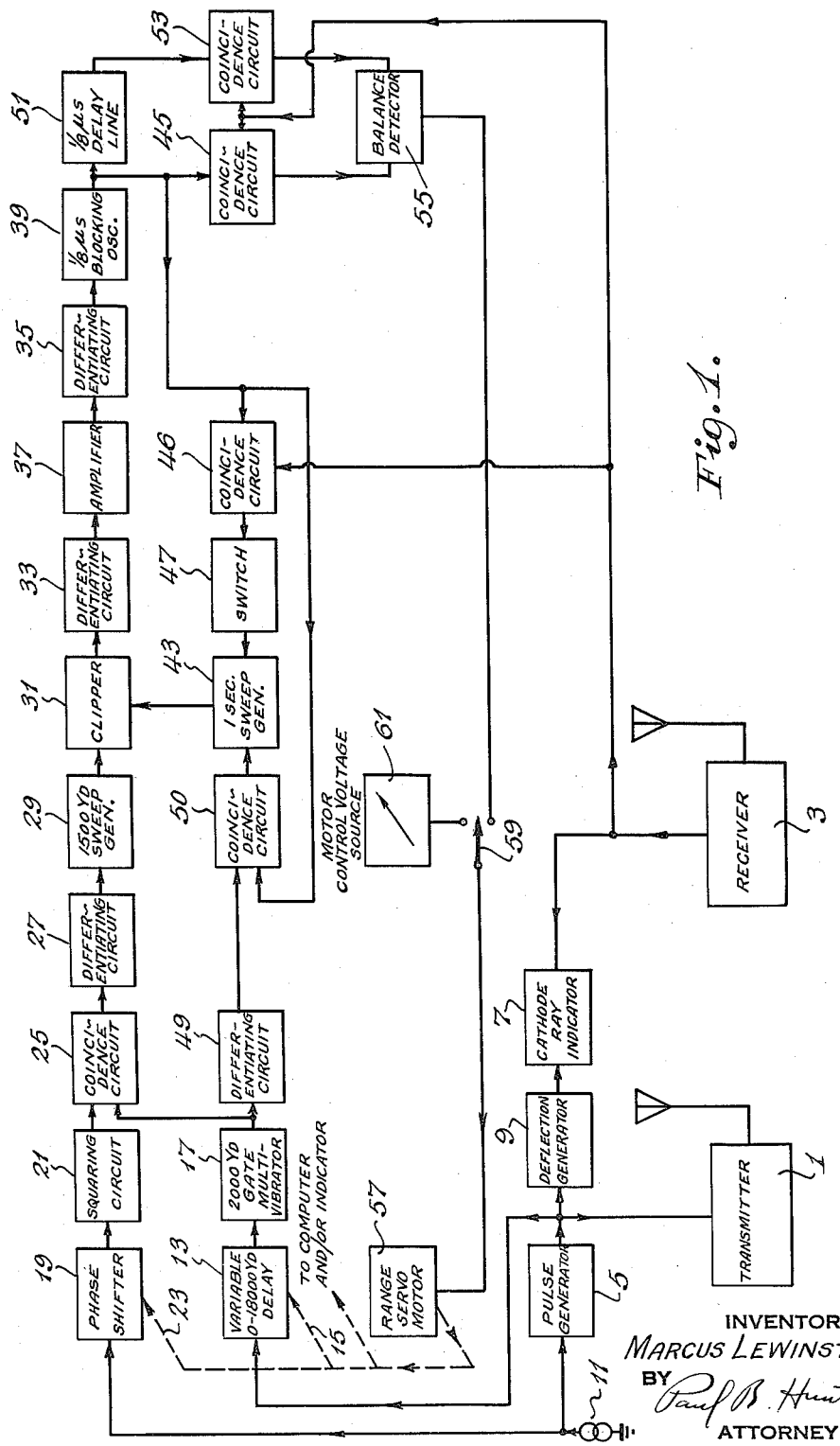
Fig. 1 is a schematic block diagram of a radar system embodying the present invention.

Referring first to Fig. 1, the illustrated radar system includes a transmitter 1 and a receiver 3, a pulse generator 5 for modulating the transmitter 1, and a cathode ray oscilloscope 7 for displaying pulses received by the receiver 3. The oscilloscope 7 is provided with a cathode ray deflection generator 9 controlled by the output of the pulse generator 5.

A timing oscillator 11, preferably crystal controlled so as to closely maintain a fixed frequency, controls the pulse generator 5. By way of example, the oscillator 11 may be designed to operate at a frequency of 81.94 kilocycles per second, so that the period of oscillation is substantially the length of time required for a pulse radiated by the transmitter 1 to travel twice (i. e. out and back) over a path 2000 yards long. The pulse generator 5 may be arranged to provide one pulse for each 24 cycles of output from the oscillator 11, so that the pulse repetition frequency is about 3400 pulses per second.

The pulses from the generator 5 are applied also to a variable delay device 13 which may include a multivibrator or similar circuit and is capable of providing a pulse delayed by an amount which is continuously and linearly variable from substantially zero to about 110 microseconds, for example, corresponding to a range of zero to approximately 18,000 yards. The amount of delay is adjusted by means of a shaft represented schematically by the dash line 15.

The delayed pulses from the delay device 13 are applied to a multivibrator or similar device 17 which produces substantially rectangular wave pulses of width corresponding to a range if 2000 yards (i. e. about 12.2 microseconds). These latter pulses are denoted the wide gate or 2000 yard gate, and one is initiated in response to each delayed pulse from the delay device 13.

The output of the timing oscillator 11, in addition to controlling the pulse generator 5, also goes to a variable phase shifter 19 and thence to a "squaring" circuit 21. The phase shifter 19 may be of the goniometer type, to provide a phase shift adjustable continuously through zero to 360 degrees. The phase shift is varied by means of a shaft 23, which is ganged with the shaft 15 of the delay device 13 in such manner that the rate of change of the phase shift provided by the device 19 is always equivalent to the rate of change of the delay provided by the delay device 13. For example, if the shaft 23 is rotated to change the phase shift by 180 degrees, corresponding to a change in range of 1000 yards, the shaft 15 will be rotated to change the delay of the pulse from the device 13 by 6.1 microseconds, also corresponding to a change of 1000 yards.

The squaring circuit 21 may be simply a limiter for converting the sine wave input thereto to a square wave.

Figure 2:
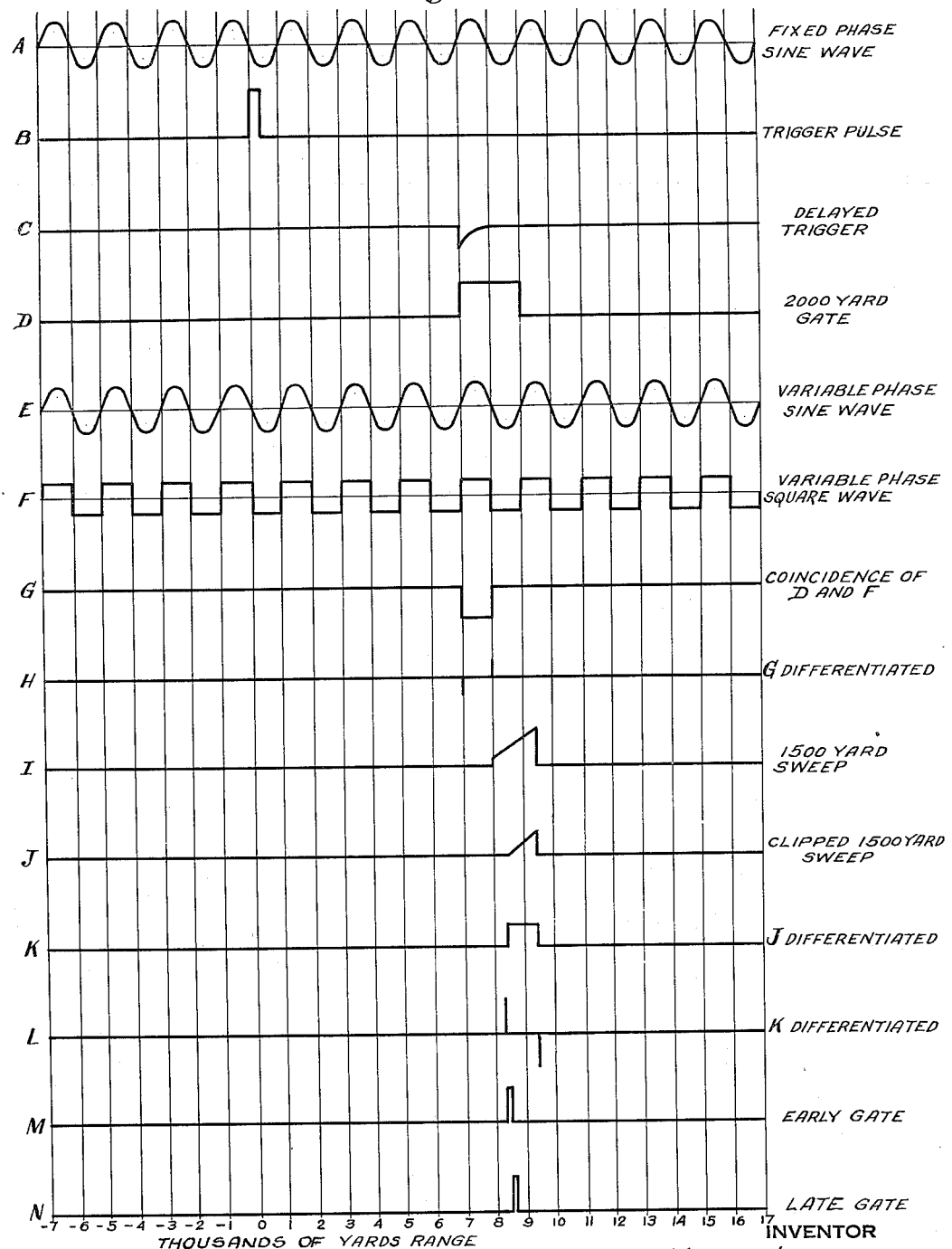
Fig. 2 is a series of graphs representing the wave forms of various voltages occurring in the operation of the system of Fig. 1.

Referring to Fig. 2, A is the fixed-phase timing wave provided by the oscillator 11. B is the pulse from the pulse generator 5, and also represents approximately the envelope of the radio frequency pulse sent out by the transmitter 1. C is the output pulse from the delay device 13, in the present illustration delayed about 7000 yards with respect to the pulse B. D is the resulting 2000 yard gate produced by the multivibrator 17. The output of the phase shifter 19 is the sine wave E, and the square wave F is produced therefrom by the squaring circuit 21.

Returning to Fig. 1, the 2000 yard gate voltage from the multivibrator 17 and the 82 kilocycle square wave from the circuit 21 are applied to respective input terminals of a coincidence circuit 25, which may be a tube having two control grids biased to allow conduction only when positive input signals are applied to both grids simultaneously. The output of the coincidence circuit 25 goes through a differentiating network 27 to a sweep generator 29. The generator 29 may be a multivibrator circuit including a shunt capacitor across its output terminals which integrates the rectangular wave output therefrom to provide a sawtooth shaped wave.

Referring again to Fig. 2, it will be seen that the leading edge of the 2000 yard gate pulse D is always coincident with a positive-going edge of the 82 kilocycle square wave F, because the phase shifter 19 and the variable delay network 13 are ganged together as described above. The output from the coincidence circuit 25 is thus a square pulse G, whose width is the same as one excursion of the square wave F and corresponds to a range of 1000 yards.

The differentiating network 27 produces narrow "spikes" H coincident with the leading and trailing edges of the pulse G. The leading edge spike H is negative in polarity and has no effect on the generator 29. The trailing edge spike H is positive, and triggers the generator 29 to initiate an output wave therefrom. The generator 29 is so designed as to provide an output pulse whose width corresponds to a range of about 1500 yards. The integrated 1500 yard pulse is a generally sawtooth shaped wave I, starting at the center of the 2000 yard gate D and rising uniformly to a point well beyond the trailing edge of the 2000 yard gate. Preferably the circuit is designed to provide a small discontinuity or step at the beginning of the triangular wave I.

The 1500 yard sweep wave I is supplied to a clipper 31, which passes only that portion of the wave having more than a certain amplitude. The minimum amplitude which will go through the clipper is called the clipping level, and depends upon the magnitude of a bias or control voltage applied to the clipper. As shown at J in Fig. 2, the effect of clipping the 1500 yard sweep voltage I is to delay the starting point, as well as decreasing the amplitude. The higher the clipping level, the less of the 1500 yard sweep will get through the clipper, and the later the starting point will be.

The clipped sweep voltage J is differentiated twice in succession by differentiating networks 33 and 35. An amplifier 37 is included between the two differentiating networks. In Fig. 2, K represents the result of the first differentiation, and is seen to be a rectangular pulse whose starting point coincides with that of the clipped sweep J, and thus varies with the clipping level. The graph L shows the two spikes, positive going and negative going respectively, produced by differentiation of the pulse K. The positive going spike L coincides with the leading edge of the pulse K and is used to trigger a pulse generator 39, such as a blocking oscillator. The output of the generator 39 is a pulse M, and may have a width of the order of one eighth microsecond. This pulse is referred to hereinafter as a "narrow gate," or as the "early gate."

From the foregoing description, it will be seen that each pulse M occurs at a time after each respective transmitted pulse B which depends upon, among other things, the clipping level of the clipper 31. In the practice of the present invention, the voltage for controlling the clipping level is supplied by a sweep generator 43, which is designed to produce a substantially triangular wave having a period of about one second.

As described more fully hereinafter, the range sweep generator 43 may include a relatively large capacitor which is charged slowly to provide the slowly increasing range sweep voltage, then discharged rapidly to repeat the cycle. The periodic discharge may be produced in response to the output of a coincidence circuit 50. The circuit 50 is supplied with the early gate pulse from the generator 39, and with the 2000 yard gate pulse, through a differentiating circuit 49. The arrangement is such that coincidence between the narrow gate M and the trailing edge of the 2000 yard gate D will discharge the capacitor and initiate a range sweep cycle. Thus, during normal operation of the sweep generator 43, the clipping level starts at some low value, such as zero, and increases slowly to a maximum value at the end of a one second period, then falls quickly to its minimum value, and starts to increase again. The effect of this is to vary cyclically the delay of the narrow gate pulse M with respect to the transmitted pulse B.

The pulse M is applied to one input of a conicidence circuit 46, and the output of the receiver 3 goes to the other input of the circuit 46. The output of the coincidence circuit 46 goes to a switch circuit 47 which will be described in detail hereinafter. For the present it is sufficient to understand that the switch circuit 47, when activated by a pulse from the coincidence circuit 46, stops the operation of the sweep generator 43 by preventing further increase in its instantaneous output voltage, and then gradually reduces said voltage substantially to zero, maintaining said condition thereafter as long as the received pulse and the narrow gate remain in coincidence.

The early gate pulse M goes to a coincidence circuit 45 and also is passed through a delay line 51 to another coincidence circuit 53 like the coincidence circuit 45. The circuits 45 and 53 are also connected to the output terminal of the receiver 3. The delay line 51 is designed to provide a delay of one eighth microsecond, i. e. the width of the early gate M, and accordingly its output, shown in Fig. 2 at N, is a one eighth microsecond pulse whose leading edge coincides with the trailing edge of the early gate pulse M. The pulse N is designated as the "late gate."

The outputs of the coincidence circuits 45 and 53 are applied to respective input terminals of a balance detector 55 which compares the amplitude of the two outputs and provides an output in the form of a D.-C. control voltage which goes positive or negative with respect to a reference value in accordance with the difference between said amplitudes. A voltage responsive follow-up motor or servomotor 57 is controlled by the output of the detector 55 to drive the variable delay network 13 and the phase shifter 19. It will be understood that an amplifier or relay system may be included in the connections between the motor 57 and the detector 55 to enable the relatively small power output of the detector to control the motor. The motor 57 runs in one direction when the control voltage from the detector 55 is above the reference value, and in the other direction when the control voltage is below the reference value.

The overall operation of the system of Fig. 1 will now be described.

Each pulse from the generator 5 causes the transmitter 1 to produce a corresponding pulse of radio frequency energy, which is radiated. Any reflecting object or target in the path of the radiated energy intercepts and reflects some of said energy, and a portion of the reflected energy returns to the receiver 3. This produces an output pulse from the receiver 3, similar to the original pulse from the generator 5 but delayed with respect thereto by the time required for radiation to travel from the transmitter to the reflecting object and back to the receiver. This time is proportional to the distance or range of the reflecting object from the radar equipment.

Initially, except by a remote chance, the received pulse will not coincide with or overlap either of the two narrow gate pulses N and M. The motor 57 may be operated either automatically or under manual control to start driving the shafts 15 and 23 from their position corresponding to minimum range toward the position corresponding to maximum range. This may be accomplished by providing a switch 59 in the motor control circuit, for connecting the motor 57 to a motor control source 61.

When a pulse is received, the operator may observe the approximate distance of the target on the oscilloscope 7, and throw the switch 59 to its lower position when the motor 57 has driven the 2000 yard gate out to a position such that its upper half includes the range of the desired target. Owing to the operation of the electronic range sweep system described above, the narrow gates M and N will be periodically swept in range throughout the second half of the 2000 yard gate. When the early gate M coincides with the received pulse, the coincidence circuit 46 produces a pulse to actuate the switch 47 and stop the range sweep.

Unless the received pulse overlaps the early and late gates M and N equally, the balance detector will energize the motor 57 to increase or decrease the range for which the phase shifter 19 and the delay network 13 are set, advancing or withdrawing the 2000 yard gate, and hence the narrow gate pulses M and N, until the received pulse overlaps the narrow gate pulses equally.

Meanwhile, the voltage at the output terminal terminal of the range sweep generator 43 decreases slowly, tending to make the narrow gate pulses occur earlier or move in to a shorter range. This is counteracted by further operation of the motor 57 in response to the balance detector 55, which effects slow outward motion of the 2000 yard gate until it is centered on the received pulse. At this time the position of the motor 57 and the shafts connected to it corresponds exactly to the target range. Owing to the relatively gradual "locking in" on the target, any tendency for the motor 57 to overshoot or hunt is substantially eliminated. As the range changes subsequently due to motion of the target, the motor 57 is energized as necessary to follow it.

If the target is lost as a result of momentary failure of the reflected pulses caused by fading, for example, the motor 57 does not operate immediately. The range sweep generator 43 starts to operate again, moving the narrow gates M and N out and back to search for the target pulse.

As long as no such pulse appears, the gates M and N sweep back and forth over the 1500 yard section including the second half of the 2000 yard gate. When the target pulse is received again, the sweep generator 43 stops as before and the 2000 yard gate is smoothly and gradually moved as necessary to center it on the target pulse. Thus the advantages of relatively rapid search for the target range are obtained, without requiring correspondingly rapid motion of the motor 57 and the mechanical equipment which it drives. This feature is particularly important where a mechanical computer or similar apparatus is to be driven by the range follow-up motor.

Figure 3:
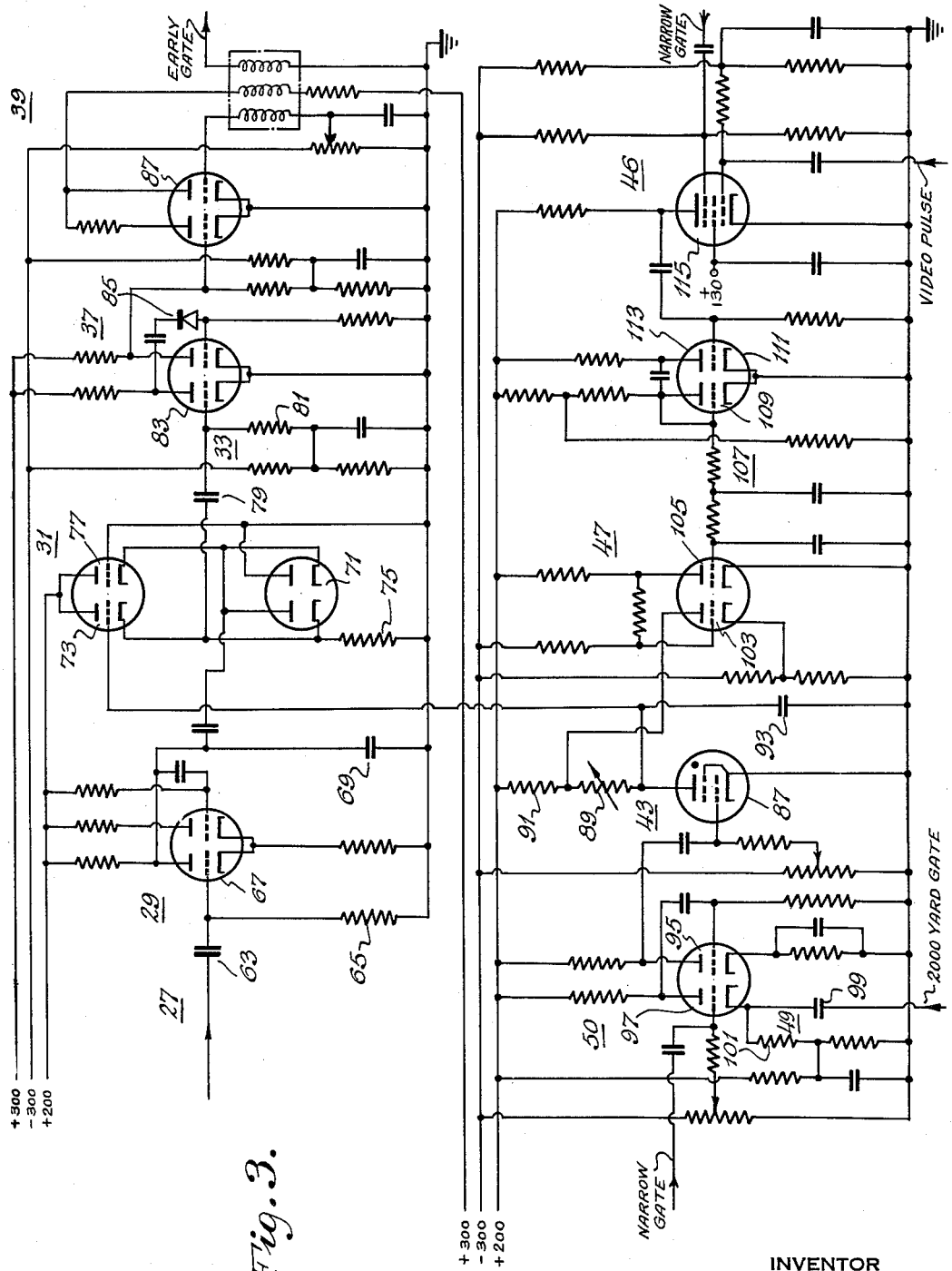
Fig. 3 is a schematic circuit diagram of a portion of the system of Fig. 1 illustrating in detail a preferred embodiment of the invention.

Fig. 3 shows the circuit details of the automatic range sweep portion of the system of Fig. 1. The differentiating circuit 27 comprises a series condenser 63 and a relatively low resistance resistor 65. The 1500 yard sweep generator 29 comprises a double triode tube 67 connected as a so-called "one-shot" multivibrator, with the grid of the second triode biased positive to keep it normally conductive and to keep the first triode normally cut off. A relatively large capacitor 69 is connected from the plate of the first triode to ground to make the output waves rise exponentially until cutoff instead of appearing as the square wave usually produced by a multivibrator.

The clipper 31 includes a diode 71, whose plate is coupled to the multivibrator 29 and whose cathode is connected to the cathode of a triode 73. The triode 73 is connected as a cathode follower with the resistor 75 acting as its load. The grid of the tube 73 is connected to the range sweep generator 43. Another triode 77 has its grid grounded and its cathode connected to the anode of the diode 71. The triode 77 also acts as a cathode follower whose load includes the internal resistance of the diode 71 and the relatively much greater resistance of the resistor 75. The effect of the triode 77 is to prevent the normal voltage drop in the resistor 75 from biasing the cathode of the diode 71 positive with respect to the anode, by maintaining the anode at substantially the same positive potential.

However, a positive voltage applied to the control grid of the triode 73 will bias the cathode of the diode 71 positive with respect to its anode by substantially the amount of said positive potential, and the diode 71 will not begin to conduct until the sawtooth wave voltage from the multivibrator 29 rises above this potential. The output of the clipper 31 is taken from the cathode of the diode 71, which is coupled through a small capacitor 79 to the amplifier 37.

The capacitor 79, together with a relatively low resistance resistor 81, acts as the differentiating circuit 33. The amplifier 37 includes a double triode tube 83, with the coupling network between the two triodes functioning as the second differentiating network 35. A crystal rectifier 85 removes any positive overshoot of the negative-going spike L of the differentiated pulse.

The oscillator 39 includes a double triode 87, with one section acting as an amplifier and the other section connected as a conventional blocking oscillator circuit.

The range sweep generator 43 comprises a thyratron 87 provided with a high resistance plate load consisting of resistors 89 and 91 in series with each other. A large capacitor 93 is connected from the anodes of the tube 87 to ground, and the anode is the output terminal going to the clipper circuit 31. The control grid of the thyratron 87 is coupled to the output terminal of an amplifier including a triode 95, which is in turn coupled to the plate circuit of a triode 97. The triodes 95 and 97 may be respective components of a double triode tube, as shown.

The tube 97 constitutes the coincidence circuit 50, and has its control grid coupled to the narrow gate generator 39. The cathode is coupled through the differentiating circuit 49, which consists of a capacitor 99 and a resistor 101, to the 2000 yard gate generator 17. When the narrow gate M has swept to the outer extreme of the 2000 yard gate D, the leading edge of the pulse M will coincide with the trailing edge of the pulse D.

The differentiated trailing edge of the 2000 yard gate drives the cathode of the tube 97 negative at the same time as the pulse M drives the grid positive. This produces a positive pulse at the plate of the amplifier 95, firing the thyratron 87. This promptly reduces the voltage at the plate of the thyratron 87 to approximately zero. The thyratron is then cut off and its plate voltage starts to rise at a rate determined by the resistors 89 and 91 and the condenser 93, thus producing the range sweep voltage wave. This operation is repeated cyclically as long as the switch circuit 47 is not actuated to stop the build-up of the voltage at the plate of the thyratron 87.

The switch circuit 47 includes a double triode tube, with the plate of one triode section 103 connected to the junction between the thyratron load resistors 89 and 91. The triode 103 is normally biased to cutoff, and its grid is conductively coupled to the plate of the other triode section 105. The triode 105 is biased to normally conduct, and its grid is coupled through a filter network 107 to the negative output terminal of a rectifier which comprises the diode-connected triode section 109 of another double triode tube 111. The remaining triode section 113 of the tube 111 is connected as an amplifier supplying the diode rectifier, and its input terminal is coupled to the coincidence circuit 46. The circuit 46 includes a multiple grid tube 115, with one of its control grids coupled to the narrow gate generator 39 and its other grid coupled to the receiver 3.

When the narrow gate M coincides with a received pulse, the coincidence circuit 46 provides an output pulse which is amplified by the triode 113 and rectified by the diode-connected triode 109. This happens repeatedly at the transmitter pulse repetition frequency, charging the condensers in the filter 107 to provide a more or less steady negative D.-C. voltage at the grid of the tube 105. The tube 105 is almost immediately cut off, and its plate goes positive, driving the grid of the tube 103 in a positive direction and thus overcoming the cutoff bias on said grid.

When the tube 103 draws plate current through the high resistance load 89, 91 of the thyratron 87, it acts substantially like a short circuit from the junction point of the resistors 89 and 91 to ground. The voltage at the plate of the thyratron, which is the output terminal of the range sweep generator 43, decreases gradually toward ground potential as the large condenser 93 discharges slowly through the high resistance 89. As explained above, this gradually shifts the narrow gate M toward the center of the 2000 yard gate D, giving the mechanical components of the range servo system sufficient time to lock in without overshoot or hunting.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A radar system including a source of timing signal, means responsive thereto to produce a relatively long duration pulse gate signal, means responsive to said timing signal and to said gate to produce a relatively short duration pulse gate signal, means normally cyclically varying the timing of said narrow gate over a range including part of the period of said long duration pulse, means responsive to coincidence of said short duration gate with a received pulse to stop said cyclical variation in timing of said short duration gate, and means responsive to deviation between said short duration gate and said received pulse to vary the timing of said long duration gate with respect to said timing signal to reduce said deviation.

2. A radar system including a source of timing signal, means responsive thereto to produce a relatively long duration pulse gate signal, means responsive to said timing signal and to said long duration gate to produce a relatively short duration pulse gate signal, means normally cyclically varying the timing of said short duration gate over a range including part of said long duration pulse, means responsive to coincidence of said short duration gate with a received pulse to stop said cyclical variation in timing of said short duration gate and slowly return said short duration gate to a predetermined timing within the period of said long duration gate, and means responsive to deviation between said short duration gate and said received pulse to change the timing of said long duration gate with respect to said timing signal to reduce said deviation.

3. A radar system including a source of timing signal, means responsive thereto to produce a relatively long duration pulse gate signal, means responsive to said timing signal and to said long duration gate to produce a relatively short duration pulse gate signal, means normally cyclically varying the timing of said short duration gate over a range including the latter half of said long duration pulse, means responsive to coincidence of said short duration gate with a received pulse to stop said cyclical variation in timing of said short duration gate and adjust the timing of said short duration gate to the center of the duration period of said long duration gate, and means responsive to deviation between said short duration gate and said received pulse to adjust the timing of said long duration gate with respect to said timing signal to reduce said deviation.

4. In a system of the described type, a source of timing signals, means responsive thereto to generate a train of repetitive pulses and means transmitting said pulses, a gate pulse generator and means for triggering said gate pulse generator at the end of an interval following each of said transmitted pulses, said last mentioned means being responsive to a control voltage to vary the length of said interval; a sawtooth wave generator producing a sawtooth wave voltage having a period of the order of several thousand times the intervals between said transmitted pulses, and means applying said sawtooth wave voltage to said means for triggering said gate generator means to periodically vary the length of said interval; means receiving said transmitted pulses after reflection by an object to be detected, and means responsive to coincidence between said gate pulses and said received pulses to stop said sawtooth wave voltage generator and to gradually decrease said interval to a predetermined length.

5. In a system of the described type, a source of timing signals, means responsive thereto to generate a train of repetitive pulses and means transmitting said pulses, a gate pulse generator and means for triggering said gate pulse generator at the end of an interval following each of said transmitted pulses, said last mentioned means including means for producing a substantially square wave whose leading edge occurs at a time after each said transmitted pulse which depends upon the magnitude of a control voltage applied thereto, means differentiating said square wave to provide a pulse coincident with said leading edge thereof, and means applying said pulse to said gate pulse generator to trigger said gate generator; a sawtooth wave generator producing a sawtooth wave voltage having a period of the order of several thousand times the intervals between said transmitted pulses, and means applying said sawtooth wave voltage to said square wave producing means to periodically vary the time of the leading edge thereof and thus vary the length of said interval; means receiving said transmitted pulses after reflection by an object to be detected, and means responsive to coincidence between said gate pulses and said received pulses to stop said sawtooth wave voltage generator.

6. In a system of the described type, a source of timing signals, means responsive thereto to generate a train of repetitive pulses and means transmitting said pulses, a narrow gate pulse generator and means for triggering said narrow gate pulse generator at the end of an interval following each of said transmitted pulses, said last mentioned means including a sawtooth wave voltage generator and means initiating a wave from said sawtooth wave generator during said interval, means for clipping and differentiating said sawtooth wave to produce a substantially square wave whose leading edge occurs at a time after each said transmittted pulse which depends upon the level at which said clipping is effected, means differentiating said square wave to provide a pulse coincident with said leading edge thereof, and means applying said pulse to said narrow gate pulse generator to trigger said narrow gate generator; a further sawtooth wave generator producing a sawtooth wave volage having a period of the order of several thousand times the intervals between said transmitted pulses, and means applying said further sawtooth wave voltage to said clipping means to periodically vary the clipping level thereof and thus vary the length of said interval; means receiving said transmitted pulses after reflection by an object to be detected, and means responsive to coincidence between said narrow gate pulses and said received pulses to stop said further sawtooth wave voltage generator and to gradually lower said clipping level to a predetermined magnitude.

7. An automatic range tracking radar system including a timing signal generator and a pulse generator coupled to said timing signal generator and controlled thereby to produce short discrete pulses, means for transmitting said pulses, a wide gate generator coupled to said pulse generator to produce a wide gate pulse of relatively long duration centered at the end of a first interval following each of said first mentioned pulses, means coupled to said timing signal generator and said wide gate generator to produce a narrow gate pulse of short duration at the end of a second interval after the center of said wide gate pulse, means for cyclically varying the length of said second interval, means for receiving said transmitted pulses after reflection from an object to be tracked, and means responsive to coincidence of said narrow gate pulses with the received pulses to stop said cyclic variation and gradually adjust the length of said first mentioned interval to correspond to the interval between transmission and reception of said first mentioned pulses.

8. An automatic range tracking radar system including a timing signal generator and a pulse generator coupled to said timing signal generator and controlled thereby to produce short discrete pulses, a wide gate generator coupled to said pulse generator to produce a wide gate pulse of relatively long duration at the end of a first interval following each of said first mentioned pulses, means coupled to said timing signal generator and said wide gate generator to produce a narrow gate pulse of short duration at the end of a second interval after the first half of said wide gate pulse, means for cyclically varying the length of said second interval from zero to a value substantially more than half the length of said wide gate pulse, and means responsive to coincidence of said narrow gate pulse with a received pulse to stop said cyclic variation and slowly increase the length of said first mentioned interval to make the center of said wide gate pulse coincide with said narrow gate pulse and said received pulse.

References Cited in the file of this patent

UNITED STATES PATENTS

| | | |
|---|---|---|
| 2,403,975 | Graham | July 16, 1946 |
| 2,433,667 | Hollingsworth | Dec. 30, 1947 |
| 2,455,265 | Norgaard | Nov. 30, 1948 |
| 2,467,208 | Hahn | Apr. 12, 1949 |
| 2,476,409 | Free | July 19, 1949 |
| 2,482,544 | Jacobsen | Sept. 20, 1949 |
| 2,483,594 | Oliver | Oct. 4, 1949 |
| 2,538,027 | Mozley et al. | Jan. 16, 1951 |
| 2,543,072 | Stearns | Feb. 27, 1951 |

FOREIGN PATENTS

| | | |
|---|---|---|
| 588,187 | Great Britain | May 16, 1947 |
| 601,401 | Great Britain | May 5, 1948 |